(12) United States Patent
Lee et al.

(10) Patent No.: US 11,146,092 B2
(45) Date of Patent: Oct. 12, 2021

(54) WIRELESS POWER TRANSMITTING APPARATUS AND WIRELESS POWER RECEIVING APPARATUS

(71) Applicant: SCRAMOGE TECHNOLOGY LIMITED, Dublin (IE)

(72) Inventors: Yun Bok Lee, Seoul (KR); Young Kil Song, Seoul (KR); Soon Young Hyun, Seoul (KR)

(73) Assignee: SCRAMOGE TECHNOLOGY LIMITED, Dublin (IE)

( * ) Notice: Subject to any disclaimer, the term of this patent is extended or adjusted under 35 U.S.C. 154(b) by 358 days.

(21) Appl. No.: 15/515,022

(22) PCT Filed: Sep. 8, 2015

(86) PCT No.: PCT/KR2015/009462
§ 371 (c)(1),
(2) Date: Mar. 28, 2017

(87) PCT Pub. No.: WO2016/052879
PCT Pub. Date: Apr. 7, 2016

(65) Prior Publication Data
US 2017/0222472 A1    Aug. 3, 2017

(30) Foreign Application Priority Data
Sep. 29, 2014   (KR) .................. 10-2014-0130529

(51) Int. Cl.
*H02J 7/02* (2016.01)
*H01F 1/26* (2006.01)
(Continued)

(52) U.S. Cl.
CPC .......... *H02J 7/025* (2013.01); *H01F 1/14733* (2013.01); *H01F 1/14775* (2013.01);
(Continued)

(58) Field of Classification Search
CPC ..... H02J 7/025; H01F 27/365; H01F 27/2871
See application file for complete search history.

(56) References Cited

U.S. PATENT DOCUMENTS 4,023,057 A * 5/1977 Meckling ................. H02K 1/17
310/154.07
5,164,242 A * 11/1992 Webster ................. B64D 15/16
156/60

(Continued)

FOREIGN PATENT DOCUMENTS

JP         2013-219991 A    10/2013
KR    10-2013-0072181 A     7/2013
(Continued)

*Primary Examiner* — David V Henze-Gongola
*Assistant Examiner* — Tarikh Kanem Rankine
(74) *Attorney, Agent, or Firm* — Vorys, Sater, Seymour & Pease

(57) ABSTRACT

According to an aspect of the present invention, a wireless power transmitting apparatus of a wireless charging system includes a substrate, a first bonding layer formed on the substrate, a soft magnetic layer formed on the first bonding layer, a second bonding layer formed on the soft magnetic layer and a transmitting coil formed on the second bonding layer, wherein at least one of the first bonding layer and the second bonding layer includes a magnetic substance.

18 Claims, 5 Drawing Sheets

(51) Int. Cl.
  *H01F 27/28* (2006.01)
  *H02J 50/50* (2016.01)
  *H01F 27/36* (2006.01)
  *H02J 50/12* (2016.01)
  *H01F 1/147* (2006.01)
  *H01F 1/20* (2006.01)
  *H01F 27/245* (2006.01)
  *H01F 27/255* (2006.01)
  *H01F 38/14* (2006.01)

(52) U.S. Cl.
  CPC .......... *H01F 1/14791* (2013.01); *H01F 1/20* (2013.01); *H01F 1/26* (2013.01); *H01F 27/245* (2013.01); *H01F 27/255* (2013.01); *H01F 27/2804* (2013.01); *H01F 27/2871* (2013.01); *H01F 27/36* (2013.01); *H01F 38/14* (2013.01); *H02J 50/12* (2016.02); *H02J 50/50* (2016.02)

(56) References Cited

U.S. PATENT DOCUMENTS

| | | | | |
|---|---|---|---|---|
| 5,371,486 A * | 12/1994 | Yamada | ............... | H01F 27/245 336/212 |
| 6,404,317 B1 * | 6/2002 | Mizoguchi | .......... | H01F 17/0006 336/200 |
| 8,803,751 B1 * | 8/2014 | Miller | .............. | H01Q 7/06 343/787 |
| 9,030,159 B2 | 5/2015 | Chen | ............... | H02J 50/10 320/108 |
| 9,178,369 B2 * | 11/2015 | Partovi | ............... | H02J 7/00 |
| 9,209,627 B2 * | 12/2015 | Baarman | ............ | H01F 17/0013 |
| 2002/0097639 A1 * | 7/2002 | Ishizaki | ................ | G11B 7/121 369/13.13 |
| 2003/0076211 A1 * | 4/2003 | Matsuta | ............. | H01F 27/2804 336/200 |
| 2005/0012652 A1 * | 1/2005 | Wakayama | .............. | H01F 1/18 342/1 |
| 2005/0231436 A1 * | 10/2005 | McLean | ............ | H01Q 13/0275 343/786 |
| 2006/0271129 A1 * | 11/2006 | Tai | .......................... | A61N 2/02 607/61 |
| 2007/0001921 A1 * | 1/2007 | Takahashi | ................. | H01Q 1/38 343/788 |
| 2007/0077691 A1 * | 4/2007 | Watanabe | .......... | H01L 27/1266 438/149 |
| 2007/0120681 A1 * | 5/2007 | Yamazaki | ............ | H01Q 1/38 340/572.8 |
| 2008/0185578 A1 * | 8/2008 | Yoshizumi | ........ | H01L 27/11206 257/40 |
| 2008/0198560 A1 * | 8/2008 | Fujiwara | ............ | H01F 17/0013 361/728 |
| 2008/0292876 A1 * | 11/2008 | Choi | .................... | H01F 10/131 428/336 |
| 2009/0243784 A1 * | 10/2009 | Iwasaki | ................ | H01F 41/046 336/200 |
| 2009/0295526 A1 * | 12/2009 | Mikami | ................ | C01G 53/006 336/196 |
| 2010/0141369 A1 * | 6/2010 | Mori | ................... | H01F 17/0013 336/200 |
| 2010/0231344 A1 * | 9/2010 | Mashino | ............... | H01F 41/046 336/200 |
| 2010/0314946 A1 * | 12/2010 | Budde | .................... | H02J 5/005 307/104 |
| 2011/0037557 A1 * | 2/2011 | Konoue | ................ | H01F 27/34 336/200 |
| 2011/0281535 A1 | 11/2011 | Low et al. | | |
| 2011/0285215 A1 * | 11/2011 | Hatase | ................ | H01F 27/2871 307/104 |
| 2012/0086538 A1 * | 4/2012 | Chu | .................... | H01F 17/0013 336/206 |
| 2012/0187457 A1 * | 7/2012 | Yamazaki | ............ | H01Q 1/2283 257/252 |
| 2012/0319811 A1 * | 12/2012 | Chu | .................... | H01F 17/0013 336/200 |
| 2013/0009740 A1 * | 1/2013 | Chang | ................... | H01F 27/255 336/200 |
| 2013/0119511 A1 * | 5/2013 | Shi | ........................ | H01F 41/04 257/531 |
| 2013/0147675 A1 * | 6/2013 | Kato | ....................... | H01Q 1/38 343/788 |
| 2013/0222101 A1 * | 8/2013 | Ito | ........................ | H01F 5/003 336/83 |
| 2013/0234820 A1 * | 9/2013 | Yoo | .................... | H01F 41/046 336/200 |
| 2013/0300207 A1 | 11/2013 | Wang | | |
| 2013/0306364 A1 * | 11/2013 | Suzuki | ................ | H05K 9/0088 174/394 |
| 2013/0333820 A1 * | 12/2013 | Sherrer | ................ | H01F 41/042 156/60 |
| 2014/0002228 A1 | 1/2014 | Hatanaka et al. | | |
| 2014/0043196 A1 * | 2/2014 | Gouchi | ................ | H01Q 1/2225 343/788 |
| 2014/0176286 A1 * | 6/2014 | Okada | ................... | C04B 35/265 336/200 |
| 2014/0186526 A1 * | 7/2014 | Chang | .................... | H01F 41/04 427/130 |
| 2014/0203985 A1 * | 7/2014 | Tsubaki | ................ | H01Q 1/243 343/788 |
| 2014/0209691 A1 * | 7/2014 | Finn | .................... | H05K 1/0233 235/492 |
| 2014/0225702 A1 * | 8/2014 | Yazaki | ................ | H01F 17/0013 336/200 |
| 2014/0239892 A1 * | 8/2014 | Sawa | ...................... | H01F 38/14 320/108 |
| 2014/0306787 A1 * | 10/2014 | Kato | ....................... | H03H 7/427 336/105 |
| 2014/0333151 A1 | 11/2014 | Matsui et al. | | |
| 2014/0333152 A1 | 11/2014 | Kawano et al. | | |
| 2014/0340030 A1 * | 11/2014 | Jung | .................... | H02J 7/00302 320/108 |
| 2014/0368307 A1 * | 12/2014 | Kato | ................... | H01F 17/0013 336/200 |
| 2015/0024236 A1 * | 1/2015 | Kang | ...................... | C22C 29/12 428/632 |
| 2015/0097521 A1 * | 4/2015 | Endou | ................ | H01F 27/2804 320/108 |
| 2015/0123604 A1 * | 5/2015 | Lee | ........................ | H02J 50/12 320/108 |
| 2015/0155084 A1 * | 6/2015 | Kim | ...................... | H01F 41/046 174/260 |
| 2015/0236517 A1 | 8/2015 | Deguchi et al. | | |
| 2015/0325362 A1 * | 11/2015 | Kumura | ................ | H01F 38/14 336/84 M |
| 2015/0331268 A1 * | 11/2015 | Hohshi | ................... | H01F 38/14 349/1 |
| 2015/0349424 A1 * | 12/2015 | Hur | .......................... | C04B 35/26 343/788 |
| 2016/0064814 A1 * | 3/2016 | Jang | ..................... | H02J 50/12 343/842 |
| 2016/0134126 A1 | 5/2016 | Tillotson et al. | | |
| 2016/0240301 A1 * | 8/2016 | Yeom | ...................... | H02J 50/90 |

FOREIGN PATENT DOCUMENTS

| | | |
|---|---|---|
| KR | 10-2013-0099124 A | 9/2013 |
| KR | 10-2014-0048722 A | 4/2014 |
| KR | 10-1394508 B1 | 5/2014 |
| WO | WO 2013/172349 A1 | 11/2013 |

* cited by examiner

WIRELESS POWER TRANSMITTING APPARATUS AND WIRELESS POWER RECEIVING APPARATUS

CROSS REFERENCE TO RELATED APPLICATIONS

This application is the National Phase of PCT International Application No. PCT/KR2015/009462, filed on Sep. 8, 2015, which claims priority under 35 U.S.C. 119(a) to Patent Application No. 10-2014-0130529, filed in the Republic of Korea on Sep. 29, 2014, all of which are hereby expressly incorporated by reference into the present application.

TECHNICAL FIELD

The present invention relates to wireless charging, and more specifically, a wireless power transmitting apparatus and a wireless power receiving apparatus included in a wireless charging system.

BACKGROUND ART

As wireless communications technology is continuing to advance, wireless power transmitting/receiving technology which wirelessly transmits power to electronic devices has started to receive more attention. This type of wireless power transmitting/receiving technology may be diversely applied not only to battery charging of mobile terminals but also to delivery of power to home appliances, electric cars, or subways.

The wireless power transmitting/receiving technology uses a fundamental principle of magnetic induction or magnetic resonance. In order to increase an efficiency of the power transmission/reception, it is necessary to maintain a proper level of inductance by increasing an effective permeability of the wireless power transmitting/receiving apparatus.

Meanwhile, the wireless power transmitting/receiving apparatus may include a substrate, a soft magnetic layer disposed on the substrate and a coil disposed on the soft magnetic layer. In this case, the coil is wound in parallel to a plane of the soft magnetic layer. Due to a limitation related to size of the coil which is wound, there is a limitation in regards to achieving a desired level of the effective permeability.

In particular, there is a problem related to the wireless power transmitting/receiving apparatus applied to a vehicle in that it is difficult to apply a high-permeability-pellet to a soft magnetic layer due to vibration or temperature variation characteristics.

Moreover, due to the vibration characteristics, a double-sided tape which is very thick should be used between the substrate and the soft magnetic layer and between the soft magnetic layer and the coil. Thus, there is a limitation in terms of being able to increase the permeability by increasing the thickness of the soft magnetic layer.

DISCLOSURE

Technical Problem

Embodiments of the present invention provide a wireless power transmitting apparatus and a wireless power receiving apparatus of a wireless charging system.

Technical Solution

According to an aspect of the present invention, a wireless power transmitting apparatus of a wireless charging system includes a substrate, a first bonding layer formed on the substrate, a soft magnetic layer formed on the first bonding layer, a second bonding layer formed on the soft magnetic layer and a transmitting coil formed on the second bonding layer, wherein at least one of the first bonding layer and the second bonding layer includes a magnetic substance.

At least one of the first bonding layer and the second bonding layer may include a magnetic layer which includes a magnetic substance, and a bonding agent which is formed on both sides of the magnetic layer.

The magnetic layer may include at least one of a sendust, a permalloy and MPP (Molybdenum Permalloy Powder).

A metal ribbon may be further formed between the magnetic layer and the bonding agent.

The bonding agent may include an insulation material.

The bonding agent may include at least one of an acrylate-based organic bonding agent, an epoxy-based organic bonding agent and a silicon-based organic bonding agent.

At least one surface of the first bonding layer and the second layer may be film-forming processed with an insulation material.

The insulation material may include $SiO_2$.

A support film may be further formed on the transmitting coil.

The soft magnetic layer may include a composite comprising any one of single metal powder/flakes or alloy powder/flakes and a polymer resin.

The alloy powder/flakes may be Fe, Co and Ni alloy powder/flakes or Fe, Si and Cr alloy powder/flakes.

The polymer resin may include at least one of a PV (polyvinyl)-based resin, a PE (polyethylene)-based resin and a PP (polypropylene)-based resin.

According to an aspect of the present invention, the wireless power receiving apparatus of the wireless charging system includes a substrate, a first bonding layer formed on the substrate, a soft magnetic layer formed on the first bonding layer, a second bonding layer formed on the soft magnetic layer, and a receiving coil formed on the second bonding layer, wherein at least one of the first bonding layer and the second bonding layer includes a magnetic substance.

According to an aspect of the present invention, the bonding layer of the wireless power transmitting apparatus or the wireless power receiving apparatus of the wireless charging system includes a magnetic layer including a magnetic substance, and a bonding agent formed on both sides of the magnetic layer.

Advantageous Effects

According to an embodiment of the invention, it may be possible to increase the effective permeability of the wireless power transmitting apparatus and the wireless power receiving apparatus, and to increase the inductance of the wireless power transmitting apparatus and the wireless power receiving apparatus. Therefore, the efficiency of power transmitting/receiving between the wireless power transmitting apparatus and the wireless power receiving apparatus can be increased.

In particularly, it may be possible to obtain a wireless power transmitting apparatus that can also be stably applied to a vehicle in which there are vibration and temperature variation characteristics.

MODE FOR INVENTION

Figure 1:
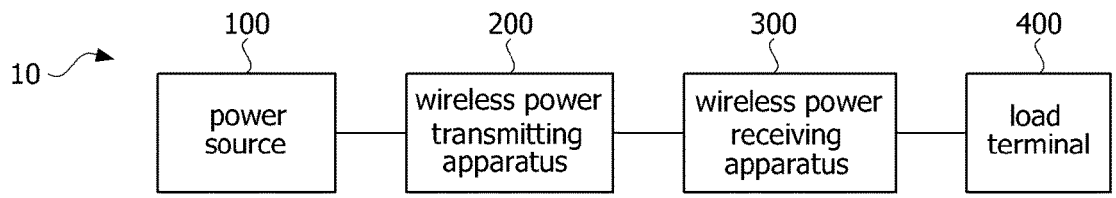
FIG. 1 is a diagram of a wireless charging system according to an embodiment of the present invention.

While the invention can allow various modifications and alternative embodiments, specific embodiments thereof are shown by way of example in the drawings and will be described. However, it should be understood that there is no intention to limit the invention to the particular embodiments disclosed, but on the contrary, the invention is to cover all modifications, equivalents, and alternatives falling within the spirit and scope of the invention.

It will be understood that although the terms including ordinal numbers such as "first," "second," etc. may be used herein to describe various elements, these elements are not limited by these terms. These terms are only used to distinguish one element from another. For example, a second element could be termed a first element without departing from the teachings of the present inventive concept, and similarly a first element could be also termed a second element. The term "and/or" includes any and all combination of one or more of the related listed items.

When an element is referred to as being "connected to" or "coupled with" another element, not only it can be directly connected or coupled to the other element, but also it can be understood that intervening elements may be present. In contrast, when an element is referred to as being "directly connected to" or "directly coupled with" another element, there are no intervening elements present.

The terminology used herein is for the purpose of describing particular embodiments only and is not intended to limit the present inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the accompanying drawings, and regardless of the numbers in the drawings, the same or corresponding elements will be assigned with the same numbers and overlapping descriptions will be omitted.

FIG. 1 is a diagram of a wireless charging system according to an embodiment of the present invention.

Referring to FIG. 1, a wireless charging system 10 includes a power source 100, a wireless power transmitting apparatus 200, a wireless power receiving apparatus 300, and a load terminal 400.

The wireless power transmitting apparatus 200 is connected to the power source 100 and receives power from the power source 100. Further, the wireless power transmitting apparatus 200 wirelessly transmits power to the wireless power receiving apparatus 300. In this case, the wireless power transmitting apparatus 200 may transmit power using an electromagnetic induction method or a resonance method. Although the power source 100 and the wireless power transmitting apparatus 200 are illustrated as separated elements, the structure is not limited thereto. The power source 100 may be included in the wireless power transmitting apparatus 200.

The wireless power receiving apparatus 300 wirelessly receives power from the wireless power transmitting apparatus 200. The wireless power receiving apparatus 300 may also receive power using the electromagnetic induction method or the resonance method. Further, the wireless power receiving apparatus 300 provides the received power to the load terminal 400.

Figure 2:
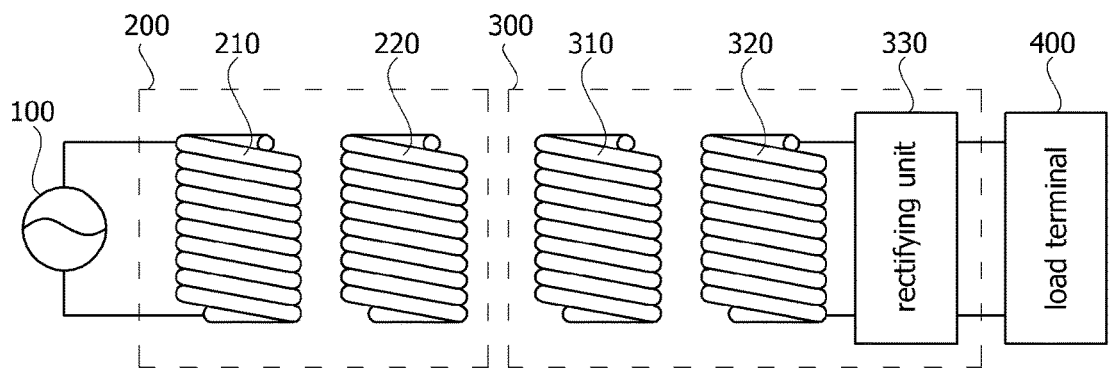
FIG. 2 is a view illustrating a method of wireless power transmission and reception for a wireless charging system according to an embodiment of the present invention.

FIG. 2 is a view illustrating a method of wireless power transmission and reception for a wireless charging system according to an embodiment of the present invention.

Referring to FIG. 2, the wireless power transmitting apparatus 200 may include a transmitting coil 210. The wireless power receiving apparatus 300 may include a receiving coil 310 and a rectifying unit 320.

The power source 100 may generate an alternating current (AC) power having a predetermined frequency and supply it to the transmitting coil 210 of the wireless power transmitting apparatus 200.

Further, the alternating current generated by the transmitting coil 210 may be delivered to the receiving coil 310, which is inductively coupled to the transmitting coil 210. On the other hand, the power delivered to the transmitting coil 201 may be delivered to the wireless power receiving apparatus 300 having the same resonance frequency as the wireless power transmitting apparatus 200 through a frequency resonance method. The power may be transferred between two impedance matched LC circuits through resonanc.

The power which is delivered to the receiving coil 310 using the electromagnetic induction manner or the resonance method may be rectified through the rectifying unit 320 and delivered to the load terminal 400.

Figure 3:
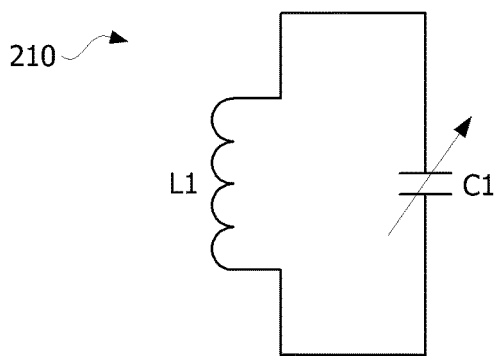
FIG. 3 is an equivalent circuit diagram of a transmitting coil according to an embodiment of the present invention.

FIG. 3 is an equivalent circuit diagram of a transmitting coil according to an embodiment of the present invention.

Referring to FIG. 3, the transmitting coil 210 includes an inductor L1 and a capacitor C1, and either end of the inductor L1 may be connected to either end of the capacitor C1.

Here, the capacitor C1 may be a variable capacitor, and impedance matching may be performed as a capacitance of the capacitor C1 is adjusted. Although an equivalent circuit diagram of the receiving coil 310 may also be similar to the equivalent circuit diagram of the transmitting coil 210, the structure is not limited thereto.

Figure 4:
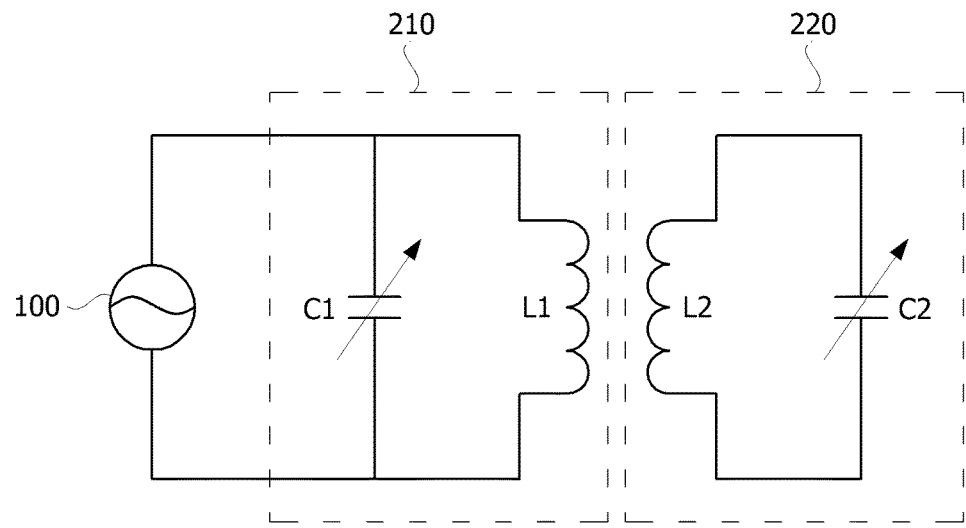
FIG. 4 is an equivalent circuit diagram of a power source and a wireless power transmitting apparatus according to an embodiment of the present invention.

FIG. 4 is an equivalent circuit diagram of a power source and a wireless power transmitting apparatus according to an embodiment of the present invention.

Referring to FIG. 4, the transmitting coil 210 may include the inductor L1 having an inductance value and the capacitor C1 having a capacitor value.

Figure 5:
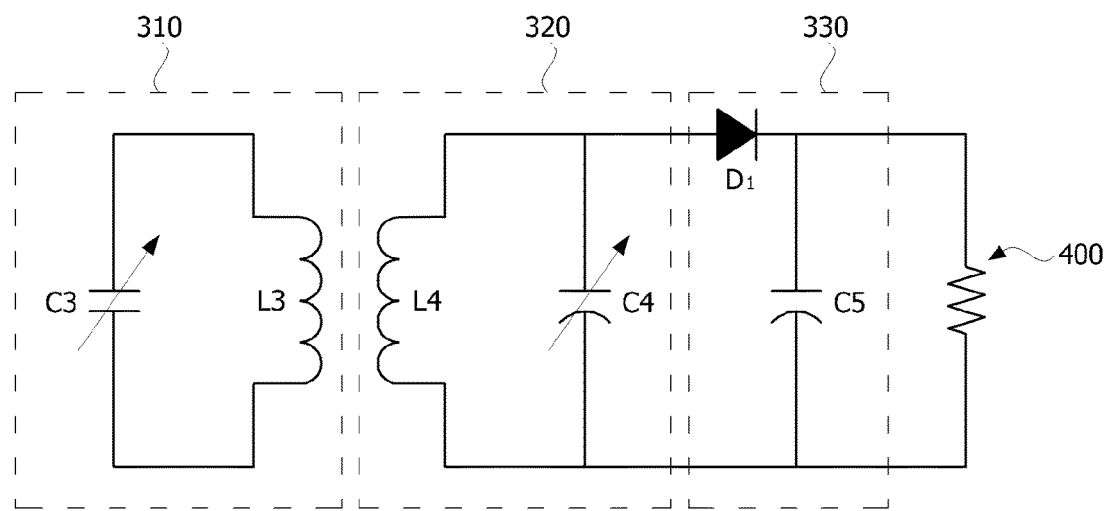
FIG. 5 is an equivalent circuit diagram of a wireless power receiving apparatus according to an embodiment of the present invention.

FIG. 5 is an equivalent circuit diagram of a wireless power receiving apparatus according to an embodiment of the present invention.

Referring to FIG. 5, the receiving coil 310 may include an inductor L2 having an inductance value and a capacitor C2 having a capacitance value.

The rectifying unit 320 may convert the alternating current power delivered from the receiving coil 310 into a direct current (DC) power, and deliver the converted direct current power to the load terminal 400.

Specifically, the rectifying unit 320 may include a rectifier and a smoothing circuit, although they are not shown in the drawings. Although the rectifier (e.g., it may be a silicon rectifier) may be equivalently represented as a diode D1, the rectifier is not limited thereto. The rectifier may convert the alternating current power delivered from the receiving coil 310 into a direct current power. The smoothing circuit may remove an alternating element included in the DC power converted in the rectifier and output smooth DC power. Although, the smoothing circuit, for example, may be equivalently represented as a capacitor C3, the smoothing circuit is not limited thereto.

The load terminal 400 may be a battery or a device with a built-in battery.

Meanwhile, the quality factor possesses an important meaning in terms of wireless power transmission. The quality factor (Q) indicates an index of energy which may be accumulated around the wireless power transmitting apparatus 200 or the wireless power receiving apparatus 300. The quality factor (Q) may vary depending on an operating frequency (w), a shape, a size, a material, etc. of a coil, and may be represented by the following Equation 1.

$$Q=w*Ls/Rs \quad \text{[Equation 1]}$$

Here, Ls is a coil inductance, and Rs indicates a resistance corresponding to a power loss occurring in the coil itself.

The quality factor may have a value from 0 to infinity, and as the quality factor becomes greater, it may be assumed that efficiency of power transmission between the wireless power transmitting apparatus 200 and the wireless power receiving apparatus 300 increases.

According to an embodiment of the present invention, increase of coil inductance is intended by including a magnetic substance in a bonding layer.

Figure 6:
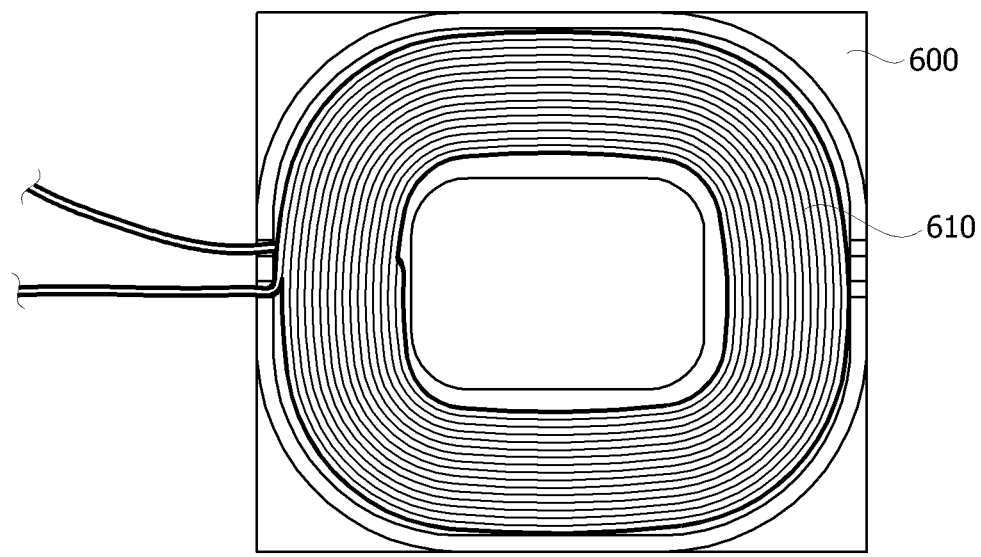
FIG. 6 is a top view of a soft magnetic layer and a transmitting coil included in a wireless power transmitting apparatus according to an embodiment of the present invention.

FIG. 6 is a top view of a soft magnetic layer and a transmitting coil included in a wireless power transmitting apparatus according to an embodiment of the present invention.

Referring to FIG. 6, a transmitting coil 610 is formed on a soft magnetic layer 600. The transmitting coil 610 may be in a wire wound shape such as a spiral or a helical shape on a plane. Although the transmitting coil 610 may have a round shape, a racetrack shape, a rectangular shape, a triangular shape, or a polygonal shape which has rounded corners, the transmitting coil 610 is not limited to these shapes thereto.

Figure 7:
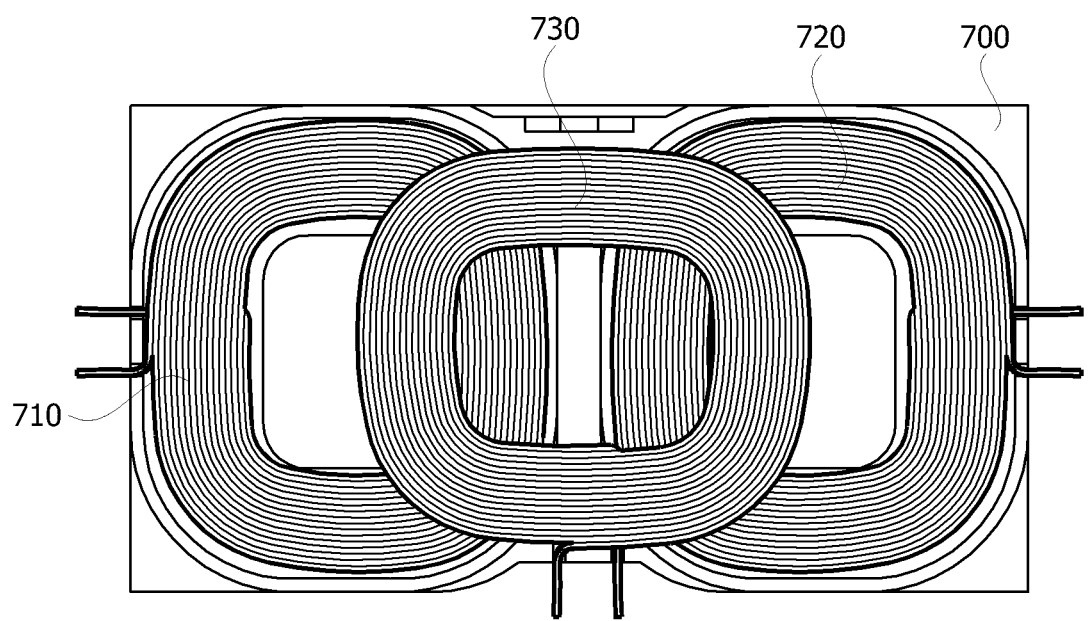
FIG. 7 is a top view of a soft magnetic layer and a transmitting coil included in a wireless power transmitting apparatus according to another embodiment of the present invention.

FIG. 7 is a top view of a soft magnetic layer and a transmitting coil included in a wireless power transmitting apparatus according to another embodiment of the present invention.

Referring to FIG. 7, transmitting coils 710, 720 and 730 are formed on a soft magnetic layer 700. Each transmitting coil 710, 720 and 730 may be in a wire wound shape such as a spiral or a helical shape on a plane. Although each transmitting coil 710, 720 and 730 may be in a round shape, a racetrack shape, a rectangular shape, a triangular shape or a polygonal shape which has rounded corners, the shapes are not limited thereto. The transmitting coil 710 and the transmitting coil 720 are disposed in parallel, and the transmitting coil 730 may be disposed on the transmitting coil 710 and the transmitting coil 720.

Figure 8:
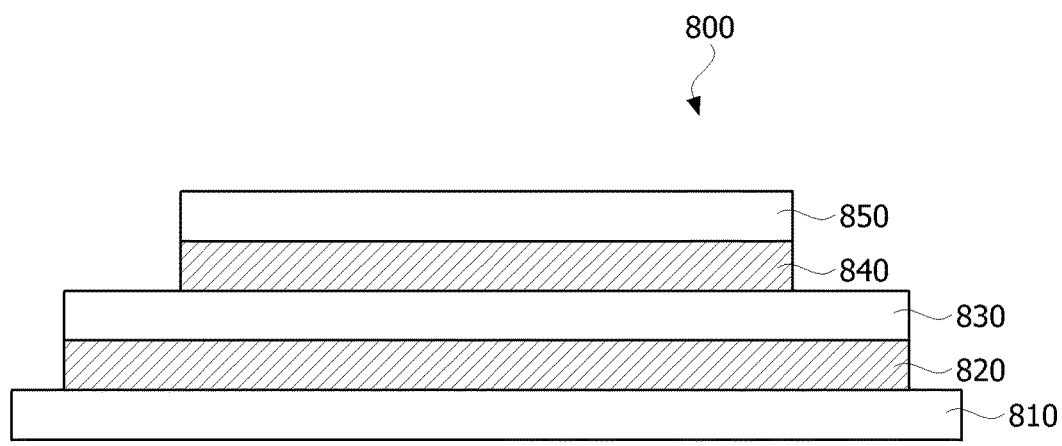
FIG. 8 is a cross-sectional view of a wireless power transmitting apparatus according to an embodiment of the present invention.
Figure 9:
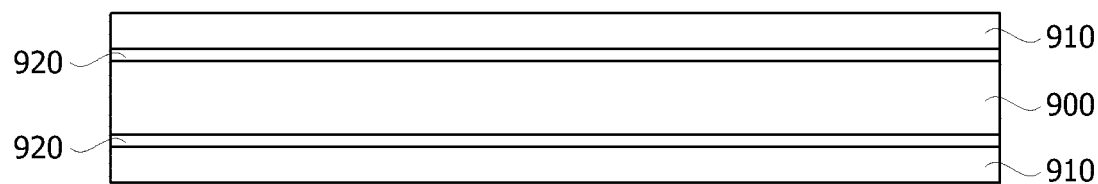
FIG. 9 is a cross-sectional view of a bonding layer included in a wireless power transmitting apparatus according to an embodiment of the present invention.

FIG. 8 is a cross-sectional view of a wireless power transmitting apparatus according to an embodiment of the present invention, and FIG. 9 is a cross-sectional view of a bonding layer included in a wireless power transmitting apparatus according to an embodiment of the present invention.

Referring to FIG. 8, a wireless power transmitting apparatus 800 includes a substrate 810, a first bonding layer 820 formed on the substrate 810, a soft magnetic layer 830 formed on the first bonding layer 820, a second bonding layer 840 formed on the soft magnetic layer 830 and a transmitting coil 850 formed on the second bonding layer 840.

The substrate 810 may be a plastic material substrate or a metal material substrate. The substrate 810 may also be a PCB (Printed Circuit Board). The substrate 810 may be a case of the wireless power transmitting apparatus 800. Thus, the substrate 810 may be used with an instrument.

The soft magnetic layer 830 may be embodied in various forms such as a pellet, a plate, a sheet, a ribbon, a foil, a film, a composite, etc. However, when the wireless power transmitting apparatus 800 is applied to a vehicle, the pellet is difficult to use due to vibration or temperature characteristics of vehicles. Thus, the soft magnetic layer 830 may include a composite comprising a single metal or an alloy powder/flakes and a polymer resin. Here, although the alloy powder/flakes may include at least one of Fe, Co and Ni alloy powder/flakes and Fe, Si and Cr alloy powder/flakes, they are not limited thereto. Further, although the polymer resin may include at least one of a PV (polyvinyl)-based resin, a PE (polyethylene)-based resin and a PP (polypropylene)-based resin, the polymer resin is not limited thereto. In this case, the soft magnetic layer 830 may include 90 wt % or more of an alloy powder/flakes, and 10 wt % or less of a polymer resin.

The transmitting coil 850 is formed on the soft magnetic layer 830. The coil 850 may be wound in a direction parallel to a plane of the soft magnetic layer 830 on the soft magnetic layer 830. Although it is not shown, a support film may further be formed on the transmitting coil 850. The support film is for supporting the transmitting coil 850, and it may include a PET (polyethylene terephthalate) material.

Meanwhile, the first bonding layer 820 is formed between the substrate 810 and the soft magnetic layer 830, and bonds the substrate 810 and the soft magnetic layer 830 together. Further, the second bonding layer 840 is formed between the soft magnetic layer 830 and the transmitting coil 850, and bonds the soft magnetic layer 830 and the transmitting coil 850 together. In this case, at least one of the first bonding layer 820 and the second bonding layer 840 includes a magnetic substance. When at least one of the first bonding layer 820 and the second bonding layer 840 includes a magnetic substance, the effective permeability of the wireless power transmitting apparatus 800 may increase, and the inductance may increase.

Referring to FIG. 9, at least one of the first bonding layer 820 and the second bonding layer 840 includes a magnetic layer 900 and a bonding agent 910 formed on both sides of the magnetic layer.

The magnetic layer 900 may be a magnetic sheet, a magnetic film, a magnetic foil, etc. that includes a magnetic substance with high permeability. Here, although the magnetic substance with a high permeability may, for example, be a sendust, a permalloy, a MPP (Molybdenum Permalloy Powder), etc., the magnetic substance with high permeability is not limited thereto. The sendust refers to a Fe—Si—Al ternary alloy. The permalloy refers to a Ni—Fe binary alloy. Accordingly, an initial permeability of the magnetic layer 900 may be 500μ' or more, and the difference in the initial permeability between the magnetic layer and the soft magnetic layer 830 may be 100μ' or more at a range of 100 to 300 kHz. Here, the magnetic layer 900 may replace a dielectric substance film substrate of a general double-sided tape, which bonds the substrate 810 and the soft magnetic layer 830 or the soft magnetic layer 830 and the coil 850. Accordingly, without increasing an overall thickness of the wireless power transmitting apparatus or the wireless power receiving apparatus, it may be possible to increase effective permeability, and to increase inductance.

In this case, a metal ribbon may further be formed between the magnetic layer 900 and the bonding agent 910. Here, the metal ribbon may refer to a thin film which is made by spreading out a metal very slightly in a single atomic unit. Since the permeability of the metal ribbon is very high, without increasing an overall thickness of the wireless power transmitting apparatus, it may be possible to further increase effective permeability, and to increase inductance.

Meanwhile, when permeability of the magnetic layer 900 is higher than that of the soft magnetic layer 830, an electromagnetic component may be compensated due to a current conducted between the first bonding layer 820 or the second bonding layer 840 and the soft magnetic layer 830. Accordingly, the bonding agent 910 may include an insulation material. For instance, the bonding agent 910 may include an acrylate-based organic bonding agent, an epoxy-based organic bonding agent, a silicon-based organic bonding agent, etc.

In other cases, a surface of the first bonding layer 820 or the second bonding layer 840 may be film-forming processed with $SiO_2$ or the like. Accordingly, the soft magnetic layer 830 may be insulated from the first bonding layer 820 or the second bonding layer 840.

Hereinafter, a test result related to inductance of a wireless power transmitting apparatus according to an embodiment of the present invention is explained.

Figure 10:
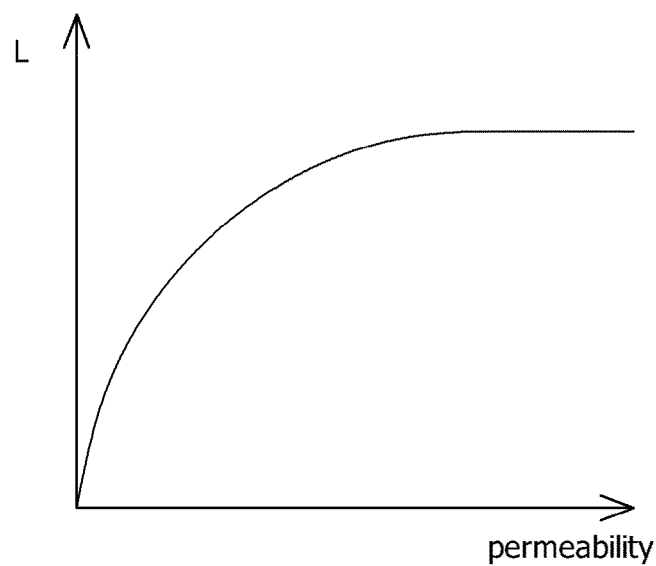
FIG. 10 is a graph, when a bonding layer does not include a magnetic substance, explaining an increasing rate of inductance based on an increase in permeability thereof.
Figure 11:
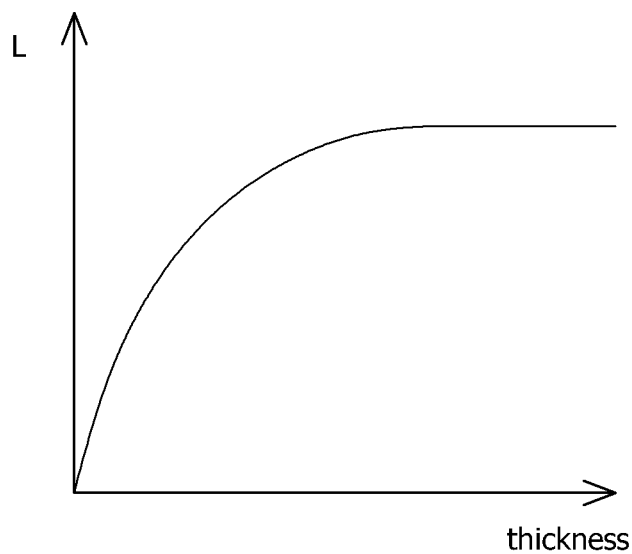
FIG. 11 is a graph, when a bonding layer does not include a magnetic substance, explaining an increasing rate of inductance based on an increase in a thickness thereof.

FIG. 10 is a graph, when a bonding layer does not include a magnetic substance, explaining an increasing rate of inductance according to an increase in permeability thereof, and FIG. 11 is a graph, when a bonding layer does not include a magnetic substance, explaining an increasing rate of inductance according to an increase in thickness thereof.

Referring to FIG. 10 and FIG. 11, the inductance increases up to a certain level as permeability (μ') or thickness increases; however, when the inductance arrives at the certain level, it does not increase anymore, but rather is saturated.

Figure 12:
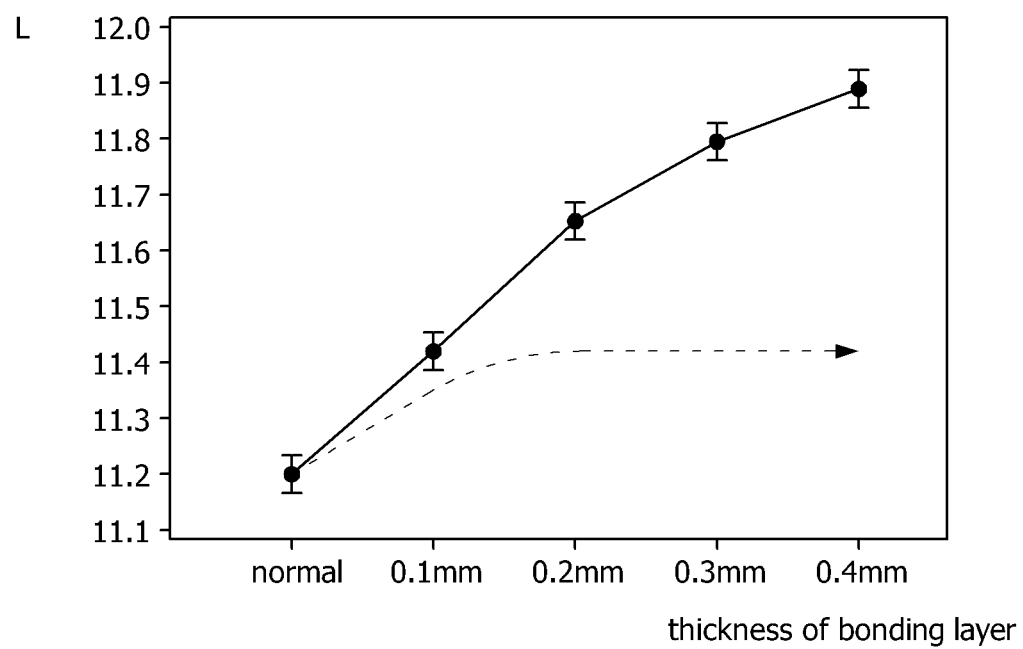
FIG. 12 is a graph, when a bonding layer includes a magnetic substance, explaining an increasing rate of inductance based on an increase in thickness thereof.

FIG. 12 is a graph, when a bonding layer includes a magnetic substance, explaining an increasing rate of inductance according to an increase in thickness thereof.

Here, a substrate, a soft magnetic layer and a coil are laminated in a sequence, and a bonding layer is formed between the substrate and the soft magnetic layer and between the soft magnetic layer and the coil. A soft magnetic layer which has permeability (μ) of 26 and a thickness of 2.0 mm is used, and a bonding layer between the soft magnetic layer and a coil is fixed at a thickness of 0.1 mm.

After measuring inductance when a bonding layer does not include a magnetic substance (normal), i.e. when using a general double-sided tape in which a bonding agent is formed on both sides of a substrate made by an dielectric film, the inductance was measured while increasing the thickness of a bonding layer from 0.1 mm to 0.4 mm, wherein the bonding layer included a magnetic substance of which permeability (μ) was 500 and a thickness ratio of a magnetic layer and a bonding agent was 7:3.

As shown in FIG. 12, when the bonding layer includes the magnetic substance (approximately 11.4), it can be found that the inductance is higher than the case that the bonding layer does not include a magnetic substance (approximately 11.2). Further, it can be found that even if a bonding layer including a magnetic substance becomes thicker, the inductance thereof is not saturated, but rather it increases continuously.

Thus, according to an embodiment of the present invention, a wireless power transmitting apparatus having high inductance may be achieved. Moreover, a desired level of inductance may be achieved by adjusting the thickness of a bonding layer.

Hereinabove, for the sake of providing a convenient description, although a wireless power transmitting apparatus is described by way of examples, the invention is not limited thereto. Embodiments of the present invention may also be equally applied to a bonding layer which is formed between a substrate, a soft magnetic layer and a coil of a wireless power receiving apparatus. Further, when a wireless power receiving apparatus has a WPC function and NFC function simultaneously, a NFC coil may be further laminated onto a soft magnetic layer. The NFC coil may be configured to surround an outer circumference of a receiving coil.

Although exemplary embodiments of the present invention have been referenced and described above, it will be understood that it is possible for those of ordinary skill in the art to implement modifications and variations on the present invention without departing from the concept and scope of the present invention listed in the following appended claims.

DESCRIPTION OF REFERENCE NUMERALS

10: a wireless charging system
100: a power source
200: a wireless power transmitting apparatus
300: a wireless power receiving apparatus
810: a substrate
820 and 840: a bonding layer
830: a soft magnetic layer
850: a coil

The invention claimed is:

1. A wireless power transmitting apparatus of a wireless charging system, comprising:
   a substrate,
   a first bonding layer formed on the substrate,
   a second bonding layer,
   a soft magnetic layer disposed between the first bonding layer and the second bonding layer, and
   a transmitting coil formed on the second bonding layer,
   wherein each of the first bonding layer and the second bonding layer includes:
      a first bonding agent,
      a first metal ribbon disposed on the first bonding agent,
      a second metal ribbon,
      a magnetic layer disposed between the first metal ribbon and the second metal ribbon, the magnetic layer including a magnetic substance the magnetic layer having a lower surface directly contacting the first metal ribbon and an upper surface directly contacting the second metal ribbon, and the magnetic layer being thicker than the first metal ribbon and the second metal ribbon, and
      a second bonding agent formed on the second metal ribbon,
   wherein a permeability of the magnetic layer included in each of the first bonding layer and the second bonding layer is higher than a permeability of the soft magnetic layer, and
   wherein a difference in the permeability between the magnetic layer and the soft magnetic layer is 100μ' or more at a range of 100 to 300 kHz.

2. The wireless power transmitting apparatus of claim 1, wherein the magnetic layer includes at least one of a sendust, a permalloy and MPP (Molybdenum Permalloy Powder).

3. The wireless power transmitting apparatus of claim 1, wherein the first bonding agent and the second bonding agent include an insulation material.

4. The wireless power transmitting apparatus of claim 3, wherein the first bonding agent and the second bonding agent include at least one of an acrylate-based organic bonding agent, an epoxy-based organic bonding agent and a silicon-based organic bonding agent.

5. The wireless power transmitting apparatus of claim 1, wherein at least one surface of the first bonding layer and the second bonding layer is film-forming processed with an insulation material.

6. The wireless power transmitting apparatus of claim 5, wherein the insulation material includes Sift.

7. The wireless power transmitting apparatus of claim 1, further including a support film formed on the transmitting coil.

8. The wireless power transmitting apparatus of claim 1, wherein the soft magnetic layer includes a composite comprising single metal powder flakes or alloy powder flakes and a polymer resin.

9. The wireless power transmitting apparatus of claim 8, wherein the alloy powder flakes is Fe, Co and Ni alloy powder flakes or Fe, Si and Cr alloy powder flakes.

10. The wireless power transmitting apparatus of claim 8, wherein the polymer resin includes at least one of a PV (polyvinyl)-based resin, a PE (polyethylene)-based resin and a PP (polypropylene)-based resin.

11. The wireless power transmitting apparatus of claim 1, wherein the first bonding layer, the soft magnetic layer and the second bonding layer are sequentially stacked between the substrate and the transmitting coil.

12. The wireless power transmitting apparatus of claim 1, wherein the transmitting coil includes a first transmitting coil, a second transmitting coil and a third transmitting coil.

13. The wireless power transmitting apparatus of claim 12, wherein the second transmitting coil overlaps both the first and third transmitting coils, and
   wherein the first and third transmitting coils are spaced apart from each other.

14. The wireless power transmitting apparatus of claim 1, wherein each of the first metal ribbon and the second metal ribbon is a thin film formed by spreading out a metal in a single atomic unit.

15. The wireless power transmitting apparatus of claim 1, wherein a thickness ratio of the magnetic layer to each of the first and second bonding agents is 7:3.

16. The wireless power transmitting apparatus of claim 1, wherein the soft magnetic layer and the first bonding layer are both wider than the second bonding layer.

17. A wireless power receiving apparatus of a wireless charging system, comprising:
   a substrate,
   a first bonding layer formed on the substrate,
   a second bonding layer,
   a soft magnetic layer disposed between the first bonding layer and the second bonding layer, and
   a receiving coil formed on the second bonding layer,
   wherein each of the first bonding layer and the second bonding layer includes:
      a first bonding agent,
      a first metal ribbon disposed on the first bonding agent,
      a second metal ribbon,
      a magnetic layer disposed between the first metal ribbon and the second metal ribbon, the magnetic layer including a magnetic substance, the magnetic layer having a lower surface directly contacting the first metal ribbon and an upper surface directly contacting the second metal ribbon, and the magnetic layer being thicker than the first metal ribbon and the second metal ribbon, and
   a second bonding agent formed on the second metal ribbon, wherein a permeability of the magnetic layer included in each of the first bonding layer and the second bonding layer is higher than a permeability of the soft magnetic layer, and
   wherein a difference in the permeability between the magnetic layer and the soft magnetic layer is 100μ' or more at a range of 100 to 300 kHz.

18. The wireless power receiving apparatus of claim 17, wherein the first bonding layer, the soft magnetic layer and the second bonding layer are sequentially stacked between the substrate and the receiving coil.

* * * * *

UNITED STATES PATENT AND TRADEMARK OFFICE
CERTIFICATE OF CORRECTION

PATENT NO. : 11,146,092 B2
APPLICATION NO. : 15/515022
DATED : October 12, 2021
INVENTOR(S) : Lee et al.

Page 1 of 1

It is certified that error appears in the above-identified patent and that said Letters Patent is hereby corrected as shown below:

In the Specification

In Column 7, Line 48:
Insert --920-- after "metal ribbon".

In the Claims

In Column 9, Claim 6, Line 64:
Change "Sift" to --$SiO_2$--.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*